United States Patent Office 3,518,318
Patented June 30, 1970

3,518,318
OCTADIENYL PHENOLS
Edgar J. Smutny, San Francisco, Calif., assignor to Shell Oil Company, New York, N.Y., a corporation of Delaware
No Drawing. Filed May 14, 1965, Ser. No. 455,970
The portion of the term of the patent subsequent to Aug. 16, 1983, has been disclaimed
Int. Cl. C07c 39/18
U.S. Cl. 260—624    5 Claims

ABSTRACT OF THE DISCLOSURE

Primary octadienyl phenols are produced by contacting a phenol having at least one replaceable ortho or para hydrogen substituent with 1,3,7-octatriene in the presence of a palladium, platinum or ruthenium compound as catalyst, a phenoxide anion catalyst promoter and a stabilizing agent selected from an excess of the phenol and tertiary aromatic phosphine.

This invention relates to a method for the production of certain octadienyl phenols and to the novel substituted phenols thereby produced. More particularly, it relates to phenols having primary 2,7-octadienyl substituents.

Numerous methods are available in the art for the alkylation of phenols with olefins or olefinic materials to produce ring-alkylated phenol derivatives. Such processes are characterized by the production of phenol derivatives with a branched-alkyl substituent, that is, a secondary or tertiary alkyl substituent, when an alkylating agent possessing terminal ethylenic unsaturation is employed. For example, alkylation of phenol with propylene typically produces ortho- and/or para-isopropylphenol, and alkylation of phenol with isobutylene produces the corresponding tert-butyl derivatives. General methods for the production of primary alkyl or alkenyl derivatives of a phenol by direct alkylation with olefin are not available.

It is an object of the present invention to provide a method for the production of phenols having primary alkadienyl ring substituents, that is, having alkadienyl substituents bonded to the aromatic ring through the terminal carbon atom thereof, and to provide the novel phenol derivatives thereby produced. A more particular object is to provide a method for the production of phenols substituted in the ortho or para position, relative to the phenolic hydroxyl group, with primary 2,7-octadienyl substituents. An additional object is to provide the class of novel [1-(2,7-octadienyl)]phenols thereby produced. Specific objects are to provide ortho- and para-(2,7-octadienyl)phenols wherein the octadienyl substituent is attached to the aromatic ring through the terminal carbon atom thereof, and a method of producing such primary-(2,7-octadienyl)phenols.

It has now been found that these objects are accomplished by the process of reacting a phenol with 1,3,7-octatriene in the presence of certain metal compound catalysts, a phenoxide anion catalyst promoter and a stabilizing agent. The process of the invention results in the effective ring-alkylation of the phenol reactant to produce novel phenol derivatives having as a substituent on at least one of the ring carbon atoms ortho or para relative to the phenolic hydroxyl group a primary-2,7-octadienyl moiety.

The phenol reactant employed in the process of the invention comprises an aromatic ring to which is bonded a hydroxyl substituent, and wherein at least one ring carbon atom ortho or para relative to the hydroxyl group, i.e., the hydroxy-substituted carbon atom, has a replaceable hydrogen substituent. The process of the invention is applicable to phenol reactants of comparatively simple structure or to phenol reactants of relatively complex structure, such as polynuclear and/or polyhydric phenols of up to 4 to 6 aromatic rings with up to 3 phenolic hydroxyl group substituents on each ring, provided that at least one ring carbon atom ortho or para relative to at least one phenolic hydroxyl group possesses a replaceable hydrogen substituent.

Best results are obtained, however, when the phenol reactant is of comparatively simple structure and the preferred class of phenol reactants to be employed in the process of the invention are mononuclear, monohydric phenols of up to 14 carbon atoms which are free from aliphatic carbon-carbon unsaturation, that is, the phenols have the aromatic carbon-carbon unsaturation of the single aromatic ring as the only carbon-carbon unsaturation present in the molecule, and are free of active hydrogen atoms other than that of the phenolic hydroxyl group. The phenol reactant is a hydrocarbon phenol of only atoms of carbon and hydrogen besides the oxygen atom of the phenolic hydroxyl group, or is a substituted-hydrocarbon phenol of additional atoms of oxygen, nitrogen, halogen, particularly atoms of halogen of atomic number from 17 to 35, i.e., the middle halogens chlorine and bromine, besides the atoms of carbon, hydrogen and phenolic oxygen, which additional atoms are incorporated within functional groups attached to the aromatic ring. When the phenol reactant has ring-carbon substituents other than hydrogen, it is preferred that the substituents be electron-donating substituents. By the term "electron-donating substituent" as employed herein is meant a substituent normally considered to be ortho-para directing when attached to an aromatic ring. Illustrative of such substituents are alkyl, haloalkyl, halo, alkoxy, dialkylamino and the like, and phenol reactants incorporating such ring substituents are suitably employed in the process of the invention.

These phenol reactants are exemplified by phenol, p-chlorophenol, 2,4-dimethylphenol, m-propylphenol, o-bromophenol, p-methoxyphenol, p-tert-butylphenol, m-octylphenol, 3,4,5-trimethylphenol, m-chloromethylphenol, p-diethylaminophenol, m-cyclopentylphenol and the like and are represented by the formula

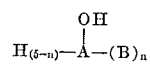

wherein A is mononuclear aromatic six-membered carbocyclic ring, B is alkoxy, alkyl, haloalkyl, halo or dialkylamino, and $n$ is a whole number from 0 to 3 inclusive, preferably from 0 to 1 inclusive, and the phenol considered as a whole is a phenol of up to 14 carbon atoms and up to 3 halogen atoms, preferably halogen of atomic number from 17 to 35 inclusive, having one of the indicated hydrogen substituents on at least one of the ring carbon atoms ortho or para relative to the hydroxyl substituent.

Particularly suitable phenol reactants are mononuclear, monohydric, hydrocarbon phenols of only atoms of carbon and hydrogen besides the oxygen of the phenolic hydroxyl group or are mononuclear, monohydric, halohydrocarbon phenols of up to 14 carbon atoms and up to 3 halogen atoms which halogen atom(s) are present in addition to the atoms of carbon, hydrogen and phenolic oxygen of an analogous hydrocarbon phenol. This class is generically represented as (halo)hydrocarbon phenols of up to 14 carbon atoms and up to 3 halogen atoms which have only aromatic unsaturation therein. Best results are obtained when the above-described hydrocarbon phenols are employed as the phenol reactant of the present process, especially when phenol is utilized.

In the process of the invention, the phenol reactant is contacted with 1,3,7-octatriene in the presence of certain metal compound catalysts, a phenoxide anion catalyst promoter and a stabilizing agent.

The catalyst employed in the process of the invention is a metal compound wherein the metal is selected from palladium, platinum and ruthenium. Particularly preferred as catalyst is a compound of a VIII C metal having an atomic number from 46 to 78 inclusive, i.e., palladium and platinum. Most preferred as catalyst is a compound of palladium. Without wishing to be bound by any particular theory, it appears that the chemical transformations during the course of the reaction which involve the metal compound are quite complex, probably involving the formation and destruction of complexes between the metal moiety and the penol or octatriene reactants. Metal compounds that are soluble in the reaction medium as well as compounds that are superficially insoluble in the reaction system are operable, in the latter case apparently through dissolved metal compound moieties, the formation of which is probably influenced by interaction with the octatriene reactant and/or the phenol reactant and the solubilization resulting therefrom. To obtain optimum reaction rates, the metallic compound is preferably soluble in the reaction mixture or serves as a precursor of a soluble metal compound. It is apparent, however, that the metal-containing catalyst may be employed in any form which serves to introduce the metal compound into the reaction system.

In one modification of the invention, the metal-containing catalyst is introduced as a salt, and palladium, platinum or ruthenium salts of organic or inorganic acids which are strong or weak acids are suitable. When the metal-containing catalyst is provided as a salt, best results are obtained through utilization of a metal halide, e.g., platinum chloride, platinum bromide, palladium chloride, palladium iodide, ruthenium chloride, ruthenium bromide and the like, and particularly suitable results are obtained when metal chlorides are employed. Also suitable are salts wherein the metal is present in the anion, as for example in the case of palladium, the use of a chloropallidate salt is satisfactory, particularly an alkali metal pallidate, e.g., sodium chloropallidate.

In an alternate modification of the process, the catalyst is provided in the form of a metal complex. Employing palladium for purposes of illustration, one type of suitable complex is a complex of palladium salt and organic ligand, such as is represented by the formula $$L_2PdX_2$$

wherein X is halogen, preferably chlorine, and L is a tertiary nitrogen-containing ligand complexed with the palladium through the nitrogen moiety thereof. Illustrative of such L groups are nitriles, both aromatic and aliphatic, such as benzonitrile, propionitrile, acetonitrile, toluonitrile and the like; heterocyclic tertiary nitrogen compounds such as pyridine, quinoline, isoquinoline, picoline and lutidine; and tertiary aliphatic amines such as triethylamine, tributylamine and dimethylhexylamine.

An equally suitable type of palladium complex is a π-allyl complex of palladium. The simplest member of this class is a π-allyl palladium salt which, when the anion is chloride, is represented by the following formula

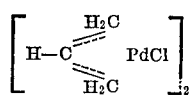

The preparation of this complex and related complexes is described by Huttel et al., Angew Chemie, 71, 456 (1959).

Other illustrative π-allyl complexes are represented by the formula

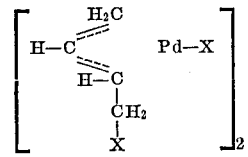

wherein X is halogen, which complexes are conveniently prepared by reaction of diene, e.g., butadiene or isoprene, with palladium halide in hydrocarbon media in the presence of other ligands, e.g., benzonitrile. Although alternate methods are available for calculating the oxidation state of the palladium present in such π-allyl complexes, it is herein considered that the palladium is palladium (II). It should be understood that analogous complexes of platinum and ruthenium are also suitable as catalysts in the process of the invention, although as previously stated, palladium-containing catalysts are generally to be preferred.

It is considered that in each above case the palladium or platinum is added as a palladium (II) or platinum (II) compound and the ruthenium is added as ruthenium (III) compound, which compounds serve as catalyst or catalyst precursor in the process of the invention. Largely for reasons of convenience and economy, the preferred metal-containing catalyst is a palladium chloride, e.g., a π-allyl palladium chloride.

The process of the invention is characterized by the requirement for only catalytic quantities of platinum, palladium or ruthenium compound. Although utilization of larger amounts of metal-containing catalyst are not detrimental to the process of the invention, amounts larger than about 1% mole based on total reactants are not generally required. Amounts of metal compound less than about 0.001% mole on the same basis are generally unsuitable because of the inevitable physical losses of catalyst during reaction and processing. In general, amounts of catalyst from about 0.01% mole to about 0.5% mole based on total reactants are satisfactory and are preferred.

Although in certain applications the metal compound alone serves as an effective catalyst, the activity of the metal compound is greatly enhanced by the presence within the reaction mixture of a phenoxide anion catalyst promoter. By the term "phenoxide anion" as employed herein is meant the anion illustratively obtained by the removal of the hydrogen moiety of at least one phenolic hydroxyl group of a phenol reactant as defined above and corresponding structurally thereto. It is not required that the phenoxide anion employed as catalyst promoter correspond to the phenol reactant undergoing reaction, and when the structure of the phenol reactant undergoing reaction is relatively complex, it may be preferable to employ a simpler phenoxide anion as the catalyst promoter. For example, when 2,6-dimethylphenol is reacted with 1,3,7-octatriene in the process of the invention, 2,6-dimethylphenoxide ion is suitably employed as the catalyst promoter, although alternatively the phenate anion, i.e., the anion corresponding structurally to that moiety produced by the removal of the acidic hydrogen of phenol, is also suitably employed. Of course, a phenoxide anion of somewhat more complex structure is also suitably utilized. In terms of the preferred phenol reactants as above defined, the phenoxide anion employed as catalyst promoter is represented by the formula

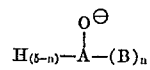

wherein A, B and $n$ have the previously stated significance. More preferred are mononuclear, monovalent (halo) hydrocarbon phenoxide anions of up to 14 carbon atoms and up to 3 halogen atoms, preferably halogen of atomic number from 17 to 35 inclusive, which have only aromatic unsaturation. The hydrocarbon phenoxide anions of this latter class are particularly suitable, with the phenate anion being particularly preferred, largely for reasons of economy and convenience.

The presence of the phenoxide anion catalyst promoter in the reaction system may be brought about by any convenient method. In one modification of the process of the invention, the phenoxide anion is prepared in situ by the addition to the reaction mixture of a base which is preferably more basic than the phenoxide anion. Reaction of the added base with the phenol reactant results in the formation of the corresponding phenoxide anion by a process of neutralization. Exemplary basis employed in an in situ formation of phenoxide anion are organic bases, particularly nitrogen-containing bases such as tertiary amines, e.g., triethylamine, trimethylamine, pyridine and quinoline. In the preferred modification of the process of the invention, phenoxide anion is added as a preformed material, customarily in the form of a soluble metal salt of a phenol. Suitable metal salts include alkali metal phenoxides, particularly sodium phenoxides, which are conveniently formed by neutralization of a suitable phenol with alkali metal base, for example an alkali metal hydroxide such as sodium hydroxide, or by direct reaction of the phenol with alkali metal either in situ or separately from the reaction system. Exemplary phenoxide anions employed in the process include phenate anion, p-chlorophenoxide anion, m-methylphenoxide anion, p-tert-butylphenoxide anion, p-methoxyphenoxide anion and the like.

The role of the phenoxide anion in the process of the invention is not completely understood. Without wishing to be bound by any particular theory, it appears probable that the phenoxide anion serves as a metal-bound ligand in the formation of metal complexes which are possible intermediate species in the process of the invention. The phenoxide anion is desirably present in molar amounts that are equal to or greater than the molar amount of the metal compound catalyst. Molar ratios of phenoxide anion to metal compound from about 1:1 to about 8:1 are satisfactory, although molar ratios from about 1:1 to about 4:1 are preferred.

The efficiency of the alkylation process is enhanced by the presence within the reaction mixture of a stabilizing agent, i.e., a material capable of imparting stability to metal-octatriene or other complexes throught to be likely intermediates in the alkylation process. In one modification of the process, an excess of the phenol reactant is employed, which excess, as defined below, serves to stabilize or otherwise enhance the character of the catalyst system. In the preferred modification of the process of the invention, a tertiary aromatic phosphine is employed as the stabilizing agent. One class of tertiary aromatic phosphines comprises a single trivalent phosphorus atom each valence of which is satisfied by bonding directly to a ring carbon atom of an aromatic moiety which is preferably mononuclear aromatic of up to 14 carbon atoms and is free of aliphatic unsaturation. Although it should be understood that the aromatic substituents of the tertiary aromatic phosphine do not necessarily bear any direct relationship to the phenol reactant undergoing reaction, the tertiary aromatic phosphine is conveniently represented by the phosphine wherein each phosphorus substituent independently corresponds structurally to that moiety illustratively produced by removal of the hydroxyl group of the phenol reactant, that is, the phosphine represented by the formula

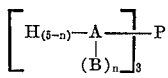

wherein the terms A, B and $n$ have the previously stated significance. Preferred, however, as the tertiary aromatic phosphine are phosphines of up to 42 carbon atoms and up to 9 halogen atoms, preferably halogen of atomic number from 17 to 35 inclusive, wherein each phosphorus substituent is mononuclear, monovalent, (halo)hydrocarbon aromatic of up to 14 carbon atoms and up to 3 halogen atoms which substituents are free from aliphatic unsaturation. Illustrative of these tertiary aromatic phosphines are triphenylphosphine, tris(p-chlorophenyl)phosphine, tris(p-octylphenyl)phosphine, tris(m-dibromomethylphenyl)phosphine, tris(p-tolyl)phosphine, bis(p-tert-butylphenyl)phenylphosphine, phenyl-bis(2,4-dimethylphenyl)phosphine and tris(2,4,6-trichlorophenyl)phosphine. Also suitable as stabilizing agents are certain principally-aromatic tertiary diphosphines wherein each phosphorus atom is substituted with two mononuclear, monovalent, (halo)hydrocarbon aromatic phosphorus substituents as above-defined and the phosphorus-connecting moiety is divalent saturated hydrocarbon aliphatic of from 2 to 3 carbon atoms, preferably $\alpha,\omega$-alkylene. Illustrative of such diphosphines are 1,2-bis(diphenylphosphino)ethane, 1,3-bis(diphenylphosphino)propane, 1,2-bis[bis(p-chlorophenyl)phosphino]ethane and 1,3-bis(p-tolylphosphino)propane. In general, however, best results are obtained when tertiary aromatic monophosphines are employed, e.g., phosphines of only 1 phosphorus atom, and the use of such phosphines is preferred. Particularly preferred as the stabilizing agent is triphenylphosphine.

In most cases, the phosphine stabilizing agent is introduced to the reaction system as a separate material. It is also useful on occasion to introduce the tertiary aromatic phosphine as a portion of a preformed metal-containing catalyst compound-tertiary aromatic phosphine complex, for example, a bis(triphenylphosphine) palladium chloride complex or a $\pi$-allyl palladium chloride-triphenylphosphine complex. In the modification wherein tertiary aromatic phosphine is employed as stabilizing agent, molar ratios of tertiary phosphine to metal compound catalyst from about 1:1 to about 3:1 are most satisfactory although higher or lower ratios may be used.

The process of the invention is conducted, in one modification thereof, by charging to a suitable reactor the phenol reactant, the octatriene reactant, the metal compound catalyst, the phenoxide anion catalyst promoter and the tertiary aromatic phosphine, if phosphine is employed. The molar ratios of phenol reactant to 1,3,7-octatriene that are suitably utilized vary from about 4:1 to about 1:4, depending in part upon whether a phosphine is to be employed as the stabilizing agent. In the modification wherein tertiary aromatic phosphine is present, molar ratios of phenol reactant to 1,3,7-octatriene from about 1:1 to about 1:4 are particularly suitable with molar ratios from about 1.5:1 to about 1:3 being preferred. Alternatively, when phosphine is not employed as stabilizing agent, efficient operation of the process is favored by reactant ratios relatively high in phenol. In the modification wherein excess phenol serves as stabilizing agent, molar ratios of the phenol reactant to the 1,3,7-octatriene from about 4:1 to about 1:1 are more suitable, especially the molar ratios from about 3:1 to about 2:1.

The alkylation reaction is effected by maintaining the reaction mixture in the liquid phase at elevated temperature at a pressure that is at least about atmospheric. Suitable reaction temperatures range from about 50° C. to about 200° C., preferably from about 70° C. to about 170° C. The optimum reaction pressure will vary from about 0.5 atmosphere to about 80 atmospheres, although pressures of at least one atmosphere are preferred. Frequently, good results are obtained when the reaction pressure is autogenous, that is, the pressure generated when the reactants are maintained at reaction temperature in a closed reactor.

The process of the invention is conducted in the presence or in the absence of a solvent. In the modification wherein solvent is employed, solvents that are suitable are those capable of dissolving the reactants and catalyst system and are inert to the reactants and the products prepared therefrom. Examplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent.

Subsequent to reaction, the product mixture is separated and the desired octadienyl phenol product is separated by conventional methods, as by fractional distillation, selective extraction, chromatographic methods or the like.

In an alternate modification of the process of the invention, the phenol and 1,3,7-octatriene reactants of the present process are prepared in situ as by degradation of an aromatic 2,7-octadienyl ether. In co-pending application of E. J. Smutny, U.S. Ser. No. 455,965, filed of even date, now abandoned the production of certain aromatic 2,7-octadienyl ethers, believed to be novel compounds, is fully described and claimed. In the process thereof phenols and butadiene are reacted in the presence of metal compound catalyst and phenoxide anion catalyst promoter substantially similar to those described herein. In terms of aromatic 2,7-octadienyl ethers which suitably provide in situ the starting materials for the present process, aromatic 2,7-octadienyl ethers, alternatively termed 1-(aromatic-oxy)-2,7-octadienes or [1-(2,7-octadienyl)]oxy-aromatics, which are represented by the following formula

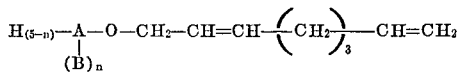

wherein A, B and $n$ have the previously stated significance, are prepared as by the process of the above co-pending application and are subsequently suitably utilized in the process of the present invention.

Thus, in the in situ modification of the present process wherein preformed aromataic 2,7-octadienyl ether is employed as the source of the phenol and 1,3,7-octatriene reactants, an aromatic 2,7-octadienyl ether represented by the above formula is charged to a reactor together with from about 0.001% mole to about 1% mole, based on the ether, of metal compound catalyst as above-defined, from about 1 mole to about 8 moles per mole of metal compound of a phenoxide anion catalyst promoter, as above-defined, and the stabilizing agent, preferably a tertiary aromatic phosphine, present in amounts of from about 1 mole to about 3 moles per mole of metal compound catalyst. The reaction mixture is maintained at a temperature from about 50° C. to about 200° C. and a pressure that is at least about atmospheric. Subsequent to reaction, the desired octadienyl phenol product is recovered by conventional means.

Athough it is not desired to be bound by any particular theory, it appears that in the modification of the process involving the use of preformed aromatic 2,7-octadienyl ether as reactant precursor, one or more equilibria are established in the presence of the catalyst system wherein the aromatic octadienyl ether is in equilibrium with the phenol corresponding to the aromataic moiety of the aromatic 2,7-octadienyl ether and 1,3,7-octatriene. Under the reaction conditions employed, alkylation of the phenol with the octatriene takes place by an irreversible process, thereby promoting equilibrium shifts which favor the formation of additional octadienyl phenol product.

As previously stated, the aromatic 2,7-octadienyl ethers employed in the above-described in situ modification of the present process are conveniently produced by reaction of a phenol and butadiene by the process of the above co-pending application of E. J. Smutny. In an alternate modification of the process of the present invention, a phenol reactant as described above, which in terms of the preferred phenols of the present process is represented by the formula

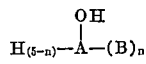

wherein A, B and $n$ have the previously stated significance, is reacted with butadiene in the presence of the catalyst, catalyst promoter and stabilizing agent of the present process, to form octadienyl phenol, presumably via an aromatic 2,7-octadienyl ether intermediate.

In the modification wherein tertiary aromatic phosphine is employed as the stabilizing agent, a phenol of the above formula is contacted with from about 3 moles to about 6 moles of butadiene per mole of the phenol reactant, in the presence of from about 0.001% mole to about 1% mole based on total reactants of metal compound catalyst, from about 1 mole to about 8 moles per mole of metal compound catalyst of phenoxide anion catalyst promoter and from about 1 mole to about 3 moles per mole of metal compound of the tertiary aromatic phosphine stabilizing agent. Although higher reaction temperatures are operable, best results are obtained when the reaction of phenol and butadiene is conducted at temperatures from about −20° C. to about 120° C. and at reaction pressures from about 1 atmosphere to about 80 atmospheres. Subsequent to the presumed ether-forming reaction the temperature, if not previously suitable for octadienyl phenol formation, is raised to a satisfactory level to allow the subsequent transformations which result in production of the desired octadienyl to proceed towards completion. The desired alkylated phenols are then recovered as previously described.

In one modification wherein an excess of the phenol is employed as the stabilizing agent, the phenol reactant is contacted with from about 0.125 mole to about 2 moles of butadiene per mole of phenol in the presence of from about 0.001% mole to about 1% mole of the metal compound catalyst and from about 1 mole to about 8 moles per mole of metal compound of the phenoxide anion catalyst promoter. In this modification also, reaction temperatures from about −20° C. to about 120° C. and pressures from about 1 atmosphere to about 80 atmospheres are suitable. Although the presumed aromatic 2,7-octadienyl ether intermediates are efficiently produced at low conversion, better results with regard to the overall process are obtained if in this modification the reaction of the phenol with the restricted amounts of butadiene is conducted to a high phenol conversion, e.g., at least about 50% and preferably at least 80%, which conversion is determinable as by observation of reactor pressure drop or by analysis of samples periodically withdrawn from the reaction mixture. The reaction mixture is then, if not previously, maintained under the conditions suitable for octadienyl phenol production, and separated to afford the desired products, as by a vapor-phase separation at at least atmospheric pressure.

The octadienyl phenol products of the process of the invention comprise a mononuclear, monohydric phenol having as a substituent on at least one ring carbon ortho or para relative to the phenolic hydroxyl a primary 2,7-octadienyl substituent. In terms of the preferred phenol reactants, such products are represented by the formula

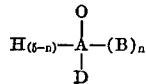

wherein A, B and n have the previously stated significance and D is a 2,7-octadienyl substituent attached through the terminal carbon atom thereof to a ring carbon atom of the aromatic moiety "A" which is ortho or para relative to the phenolic hyroxyl group. More preferred are the products of the invention which are mononuclear, monohydric, (halo)hydrocarbon phenols of up to 14 carbon atoms and up to 3 halogen atoms, preferably middle halogen atoms, having as the only aliphatic unsaturation therein the ethylenic linkages of a 1-(2,7-octadienyl) substituent located on a ring carbon atom ortho or para relative to the hydroxyl group. Although the alkylation process of the invention is considered to be suitable for introduction of a plurality of octadienyl substituents onto the aromatic ring of phenols having more than one replaceable ortho or para hydrogen atom, most frequently the phenol product is mono-alkylated, that is, has a single 1-(2,7-octadienyl) substituent, and such products are preferred.

Illustrative of the octadienyl phenol products of the invention are o-[1-(2,7-octadienyl)]phenol, p-[1-(2,7-octadienyl)]phenol, 2 - [1-(2,7-octadienyl)]-4-methylphenol, 4-[1-(2,7-octadienyl)]-2,6-dichlorophenol, 2-[1-(2,7-octadienyl)]-5-methoxyphenol, -2-[1-(2,7-octadienyl)]-4-tert-butylphenol, 2-[1-(2,7-octadienyl)]-6-tert-octylphenol, 4-[1-(2,7-octadienyl)]-2-bromophenol and 2-[1-(2,7-octadienyl)]-4,6-dimethylphenol.

The octadienyl phenols of the invention find utility in a variety of applications. Useful derivatives of the phenolic hydroxyl group are prepared, for example, ethers, carboxylic acid esters, sulfonic acid esters and polyoxyalkylene derivatives. The ethylenic linkages in the octadienyl side chain, particularly the terminal ethylenic linkage, serves as a reactive site for polymerization or for copolymerization with other olefinic monomers. The ethylenic linkages are epoxidized to produce epoxy compounds from which are prepared epoxy resins through reaction with a variety of epoxy curing agents. Such epoxy derivatives are more fully described and claimed in copending application of E. J. Smutny and W. DeAcetis, U.S. Ser. No. 455,999, filed of even date, now U.S. Pat. 3,364,176. Additionally, metal salts of the octadienyl phenols, particularly alkaline earth metal salts, are prepared which are useful as lube oil additives and the like.

To more fully illustrate the improved process of the invention and the novel products thereof, the following examples are provided. It should be understood that the details thereof are not to be regarded as limitations, as they may be varied as will be understood by one skilled in this art.

EXAMPLE I

To a reactor were charged 0.05 mole of 1,3,7-octatriene, 0.025 mole of phenol, 0.27 g. of π-allyl palladium chloride-triphenylphosphine complex, C₃H₅PdCl(C₆H₅)₃P, and 0.14 g. of sodium phenate. The reaction mixture was maintained at 90° C. for 24 hours. The resulting product mixture was then filtered and analyzed by gas-liquid chromatographic methods. The determined yield of o-[1-(2,7-octadienyl)]phenol was 15% and the yield of p-[1-(2,7-octadienyl)]phenol was 7% each based on the phenol charged.

EXAMPLE II

To a reactor were charged 0.87 mole of phenol, 0.87 mole of butadiene, 0.5 g. of palladium chloride and 1.3 g. of sodium phenate. The mixture was maintained at ambient temperature for 92 hours and then filtered and distilled at atmospheric pressure. The distillate, analyzed by gas-liquid chromatography, was found to contain a 52% yield of o-[1-(2,7-octadienyl)]phenol and a 30% yield of p-[1-(2,7-octadienyl)]phenol, based on butadiene charged. The identity of the products was confirmed by comparison with samples of the octadienyl phenols previously prepared, which samples had been identified by analysis, molecular weight and by the consistency of the nuclear magnetic resonance spectrum thereof with the above formulas.

EXAMPLE III

To a reactor were charged 0.05 mole of 1-phenoxy-2,7-octadiene, 0.15 g. of sodium phenate and 0.29 g. of π-allyl palladium chloride-triphenylphosphine complex,

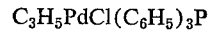

The reaction mixture was heated at 90° C. for 48 hours in a closed system, and then filtered. Analysis of the product mixture by gas-liquid chromatography indicated a 44% yield of o-[1-(2,7-octadienyl)]phenol and a 15% yield of p[1-(2,7-octadienyl)]phenol based on the phenoxy-octadiene charged.

The above procedure was repeated, except that reaction was effected by heating the mixture at 160° C. and atmospheric pressure. The yield of the o-octadienylphenol was 60%, and the yield of the corresponding para isomer was 10% based on the phenoxy-octadiene charged.

EXAMPLE IV

To a pressure reactor was charged 0.425 mole of phenol, 1.66 moles of butadiene, 1.0 g. of palladium chloride, 2.0 g. of sodium phenate and 2.3 g. of triphenylphosphine, and the mixture was maintained at 90° C. for 2.5 hours. The resulting product mixture was then filtered and distilled to afford a distillate which was shown by gas-liquid chromatographic analysis to contain a 69% yield of o-[1-(2,7-octadienyl)]phenol and a 31% yield of the corresponding para isomer, the yields being based on phenol charged.

EXAMPLE V

To a reactor were charged 0.213 mole of phenol, 0.83 mole of butadiene, 1.85 g. of π-allyl palladium chloride and 1.3 g. of sodium phenate. The mixture was maintained at a temperature from about −3° C. to about 12° C. for 6 hours. The mixture was filtered, 1.3 g. of triphenylphosphine were added thereto, and distilled. The distillate was analyzed by gas-liquid chromatography and found to contain a 13% yield of o-[1-(2,7-octadienyl)]-phenol and a 2% yield of the corresponding para isomer.

EXAMPLE VI

When p-cresol is reacted with 1,3,7-octatriene in the presence of platinum chloride sodium p-methylphenoxide and triphenylphosphine distillation of the resulting mixture at atmospheric pressure affords a good yield of 2-[1-(2,7-octadienyl)]-4-methylphenol.

Similar results are obtained when ruthenium chloride is employed in place of the platinum chloride of the above example.

EXAMPLE VII

A good yield of 2-[1-(2,7-octadienyl)]-5-chlorophenol is obtained by reacting m-chlorophenol with 1,3,7-octatriene in the presence of π-allyl palladium chloride, sodium phenate and tris(m-chlorophenyl)phosphine and subsequently distilling the product mixture at atmospheric pressure.

EXAMPLE VIII

When the procedure of Example II is followed to react p-methoxyphenol and butadiene in the presence of π-allyl platinum chloride, sodium p-methoxyphenoxide and triphenylphosphine, a good yield of 2-[1-(2,7-octadienyl)]-4-methoxyphenol is obtained.

EXAMPLE IX

To a reactor was charged 0.045 mole of phenol, 0.35 mole of butadiene, 0.1 g. of platinum chloride and 0.2 g. of sodium phenate. The mixture was maintained at ambient temperature for 1 week, and subsequent to filtration, was analyzed by gas-liquid chromatography. The yield of 1-phenoxy-2,7-octadiene, based on phenol charged, was 98%. When triphenylphosphine is added to the product mixture of the above experiment and the mixture is heated at atmospheric pressure and then distilled, a good yield of o- and p-[1-(2,7-octadienyl)]phenol is obtained.

I claim as my invention:

1. The mononuclear, monohydric phenol of up to 14 carbon atoms wherein one of the carbon atoms ortho and para relative to the hydroxyl group is 1-(2,7-octadienyl)-substituted and any additional ring substituent is a substituent selected from the group consisting of alkoxy, alkyl, and halo, said phenol being a phenol wherein the ethylenic linkages of said 2,7-octadienyl substituent are the only aliphatic unsaturation present within the molecule.

2. The compound of claim 1 having a ring substituent selected from the group consisting of alkoxy, alkyl and halo.

3. The compound [1-(2,7-octadienyl)]phenol, said 2,7-octadienyl substituent being the substituent of one of the ring carbon atoms ortho and para relative to the hydroxyl group.

4. The compound o-[1-(2,7-octadienyl)]phenol.

5. The compound 2-[1-(2,7-octadienyl)] - 4 - methylphenol.

References Cited

UNITED STATES PATENTS

| 2,662,869 | 12/1953 | Bloch. | |
| 2,777,805 | 1/1957 | Lefrancois | 252—472 |
| 3,051,762 | 8/1962 | Stroh et al. | |
| 3,267,169 | 8/1966 | Smutny | 260—682 |
| 2,560,044 | 7/1957 | Albert | 260—623 |

BERNARD HELFIN, Primary Examiner

W. B. LONE, Assistant Examiner

U.S. Cl. X.R.

252—42.7; 260—2, 80, 348, 613, 623, 574